(12) United States Patent
Yokoyama et al.

(10) Patent No.: US 10,493,985 B2
(45) Date of Patent: Dec. 3, 2019

(54) TRAVEL CONTROL DEVICE

(71) Applicant: HITACHI, LTD., Tokyo (JP)

(72) Inventors: Atsushi Yokoyama, Tokyo (JP); Kenta Maeda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 140 days.

(21) Appl. No.: 15/531,936

(22) PCT Filed: Dec. 19, 2014

(86) PCT No.: PCT/JP2014/083640
§ 371 (c)(1),
(2) Date: May 31, 2017

(87) PCT Pub. No.: WO2016/098238
PCT Pub. Date: Jun. 23, 2016

(65) Prior Publication Data
US 2017/0327112 A1    Nov. 16, 2017

(51) Int. Cl.
*B60W 30/095*  (2012.01)
*G06T 7/70*    (2017.01)
*G05D 1/02*    (2006.01)
*G06K 9/00*    (2006.01)
(Continued)

(52) U.S. Cl.
CPC ...... *B60W 30/095* (2013.01); *B60W 30/0956* (2013.01); *B60W 50/0097* (2013.01); *G05D 1/0223* (2013.01); *G05D 1/0238* (2013.01); *G06K 9/00335* (2013.01); *G06K 9/00805* (2013.01); *G06T 7/70* (2017.01); *G08G 1/166* (2013.01); *B60W 2550/10* (2013.01); *B60W 2720/10* (2013.01); *B60W 2720/24* (2013.01); *G05D 2201/0213* (2013.01)

(58) Field of Classification Search
None
See application file for complete search history.

(56) References Cited

U.S. PATENT DOCUMENTS 8,954,252 B1 *  2/2015  Urmson ............... G08G 1/166
                                               180/167
2007/0222566 A1  9/2007  Tsuji et al.
(Continued)

FOREIGN PATENT DOCUMENTS

JP    2007-279808 A    10/2007
JP    2008-186170 A    8/2008
(Continued)

OTHER PUBLICATIONS

International Search Report for WO 2016/098238 A1, dated Mar. 24, 2015.

*Primary Examiner* — Tamara L Weber
(74) *Attorney, Agent, or Firm* — Volpe and Koenig, P.C.

(57) ABSTRACT

In the present invention, it is possible to accurately predict, at an earlier timing, that a pedestrian will perform constant speed movement or a route change that is more complex than the constant speed movement. Provided is a travel control device that can accurately determine a change in the route of the pedestrian according to a change in the pedestrian's posture and, in particular, a change in the orientation of the body or a change in an inverted angle, and that can appropriately control the travel of the vehicle.

6 Claims, 4 Drawing Sheets

(51) Int. Cl.
 *G08G 1/16* (2006.01)
 *B60W 50/00* (2006.01)

(56) References Cited

U.S. PATENT DOCUMENTS

| | | | |
|---|---|---|---|
| 2009/0041302 A1* | 2/2009 | Nagaoka | G06K 9/00369 |
| | | | 382/103 |
| 2013/0218467 A1 | 8/2013 | Ogawa et al. | |
| 2014/0112538 A1 | 4/2014 | Ogawa et al. | |
| 2014/0219505 A1 | 8/2014 | Kindo et al. | |
| 2015/0334269 A1* | 11/2015 | Yokota | G06K 9/00805 |
| | | | 382/103 |

FOREIGN PATENT DOCUMENTS

| | | | |
|---|---|---|---|
| JP | 2009-012521 A | | 1/2009 |
| JP | 2010-165003 A | | 7/2010 |
| JP | 2014-006700 A | | 1/2014 |
| JP | 2014006700 | * | 1/2014 |
| WO | 2012/014280 A1 | | 2/2012 |
| WO | 2012/172629 A1 | | 12/2012 |
| WO | 2013/042205 A1 | | 3/2013 |

\* cited by examiner (a)

(b)

(c)

TRAVEL CONTROL DEVICE

TECHNICAL FIELD

The present invention relates to a device for recognizing a motion of a pedestrian around a vehicle from an image obtained using image sensing means such as a camera built in the vehicle and controlling a vehicle travel on the basis of a result of the recognition.

BACKGROUND ART

Conventionally, there is known a control device for controlling a vehicle travel by recognizing a condition around a vehicle from an image obtained from image sensing means such as a camera built in the vehicle. For example, PTL 1 discloses a vehicle surrounding monitoring device that decides a posture of a pedestrian from an image around the vehicle to rapidly determine a pedestrian to be avoided from colliding with the vehicle and presents information to a driver or controls a behavior of the vehicle. For example, PTL 2 discloses a travel support method for controlling a vehicle travel by obtaining a change of a pace length of a pedestrian, a both-foot stance time, or the like, and obtaining an predicted travel route by estimating an abrupt stop of the pedestrian.

CITATION LIST

Patent Literature

PTL 1: JP 2007-279808 A
PTL 2: JP 2009-012521 A

SUMMARY OF INVENTION

Technical Problem

In the vehicle surrounding monitoring device described in PTL 1, the extracted posture of a pedestrian is decided to determine whether or not the extracted pedestrian is a target to be avoided from colliding with the vehicle, and the vehicle control is performed on the basis of a result of this determination. However, in the collision avoidance method of the vehicle surrounding monitoring device described in PTL 1, a travel route of the pedestrian is estimated from the current pedestrian's posture. Therefore, when a speed of the pedestrian or a direction of the speed is changed, it is difficult to estimate the travel route of the pedestrian.

In the travel support method described in PTL 2, information on pixel patterns extracted from a photographic image in front of a host vehicle is obtained, and a decreasing chance of a pace length of a pedestrian approaching in a travel route of the host vehicle, a both-foot stance time, or the like is obtained, so that whether or not the pedestrian stops is determined. In addition, in order to avoid this travel route, an avoidance route is determined by setting this range as a travel inhibition range, and the travel of the host vehicle is controlled such that the host vehicle travels along the avoidance route. However, although whether or not a pedestrian stops is predicted on the basis of a decreasing change of the pace length, it is difficult to predict a chance of the speed direction of the pedestrian. Furthermore, as the pace length changes, in general, a walking speed also changes at the same time. Therefore, using a change of the walking speed, that is, information on the acceleration of the pedestrian, the travel of the host vehicle is controlled. For this reason, it is difficult to predict a travel route of a pedestrian, which is more complicate than a constant speed movement.

The present invention was made to solve the above problems, and it is an object of the present invention to provide a travel control device capable of appropriately controlling a vehicle travel by obtaining a change of a pedestrian's travel route with high accuracy.

Solution to Problem

In order to achieve the aforementioned object, the vehicle control device according to the present invention is characterized in that a speed of a vehicle is changed depending on a change between current and past pedestrian's body angles.

Advantageous Effects of Invention

Using the solving means according to the present invention described above, it is possible to provide a travel control device capable of appropriately controlling a vehicle travel by obtaining a change of the pedestrian's travel route with high accuracy.

DESCRIPTION OF EMBODIMENTS

Figure 1:
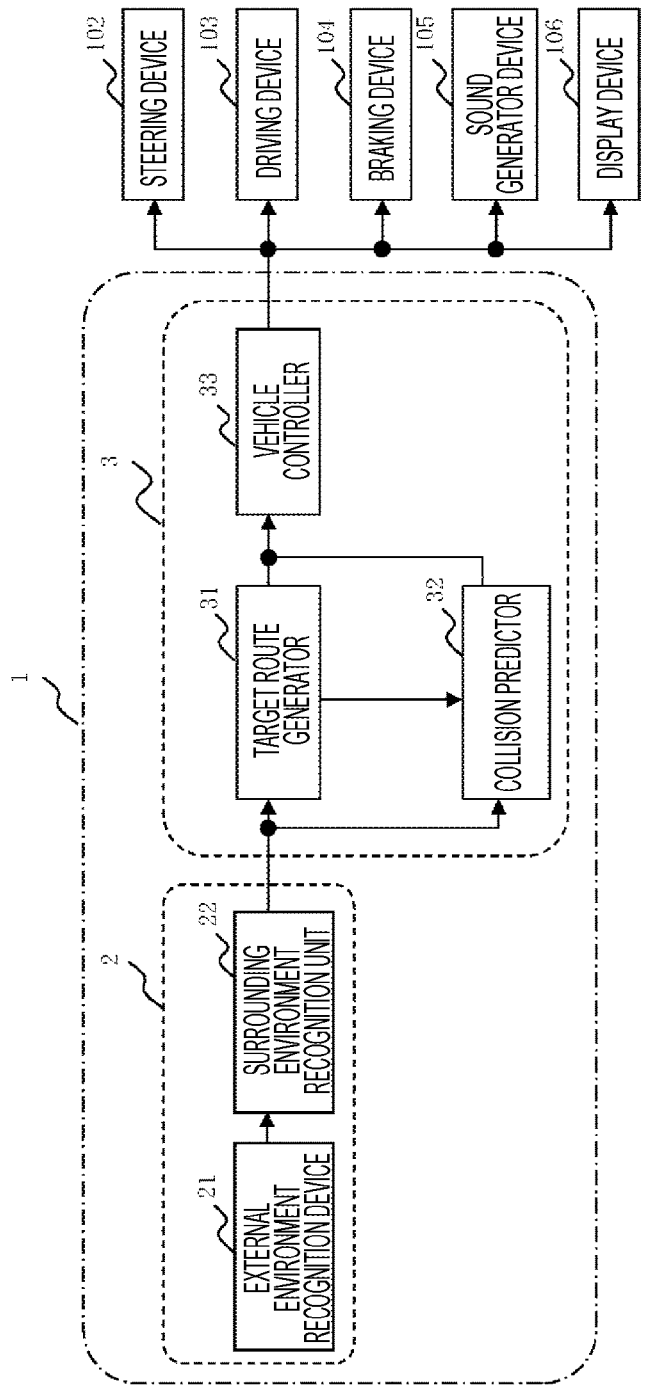
FIG. 1 is a diagram illustrating main components and a flow of information according to the present invention.

Embodiments of the present invention will now be described with reference to the accompanying drawings. FIG. 1 is a diagram illustrating an embodiment of a travel control device according to the present invention. FIG. 1 is a block diagram illustrating a surrounding environment detection device 2, a vehicle control device 3, and peripheral devices included in the travel control device 1.

The surrounding environment detection device 2 is means for detecting a surrounding environment of a host vehicle and includes an external environment recognition device 21 configured to obtain information regarding an surrounding environment of the host vehicle, and a surrounding environment recognition unit 22 configured to determine existence of an obstacle or identify a type or shape of the obstacle on the basis of image data or an electric signal of the external environment recognition device 21. For example, the external environment recognition device 21 is an on-vehicle camera for photographing a surrounding environment in front of the host vehicle. For example, the external environment recognition device 21 includes four on-vehicle cameras for photographing front, rear, left, and right surrounding environments of the host vehicle. The image data obtained from the on-vehicle camera is input to the surrounding environment recognition unit 22. The external environment recognition device 21 may include a radar that measures a distance from an object using millimeter waves or laser, a sonar that measures a distance from an object using ultrasonic waves, or the like as well as the on-vehicle camera.

The surrounding environment recognition unit 22 detects a shape or position of an object such as a solid object at rest around the host vehicle, a mobile object, a road surface paint, or a sign using the image data input from the external environment recognition device 21 or an electric signal from the radar or the like. In particular, the surrounding environment recognition unit 22 has a functionality of detecting a pedestrian's body angle as posture detection means.

The solid object at rest includes, for example, a vehicle, a wall, a pole, a curbstone, a building, or the like. In addition, the mobile object includes, for example, a pedestrian, a vehicle, a bicycle, a motorcycle, or the like. Hereinafter, the solid object at rest and the mobile object will be collectively referred to as an "obstacle." The shape or position of an object is detected using a pattern matching method or other methods. The position of the object is expressed on the basis of a coordinate system in which an origin is set to the position of the on-vehicle camera that photographs a forward sight of the host vehicle. For a pedestrian, information is detected, including a projected area toward the on-vehicle camera, positions and directions of a body, a bust, and a head, a line-of-sight direction, a grounded point between a leg and the ground surface, and the like.

The external environment recognition device 21 outputs information on a distance from a recognized object, a shape or orientation of the object, and the like as well as the image data directly as analog data or an analog-to-digital converted version to the vehicle control device 3 through a dedicated line or the like.

The vehicle control device 3 illustrated in FIG. 1 is a computer for controlling the host vehicle and serves as a target route generator 31, a collision predictor 32, and a vehicle controller 33 by executing a program stored in a storage medium (not shown). Note that the vehicle control device 3 has a memory unit 34. The memory unit 34 is capable of storing previous pedestrian's body angles.

The vehicle control device 3 is connected to the steering device 102, the driving device 103, and the braking device 104 of the host vehicle, and the surrounding environment detection device 2, the sound generator device 105, and the display device 106 provided in the host vehicle. In addition, the vehicle control device 3 is connected to an information communication line CAN (not shown) of the host vehicle, so that vehicle information such as a speed of the vehicle or a steering angle of the host vehicle is input through the CAN.

The steering device 102 includes an electric power steering or the like capable of controlling a steering angle using an electric actuator or the like in response to a driving command of the vehicle control device 3. The driving device 103 includes an engine system, an electric power train system, or the like capable of controlling a driving force in response to a driving command of the vehicle control device 3. The braking device 104 includes an electric brake, a hydraulic brake, or the like capable of controlling a braking force using an electric or hydraulic actuator or the like in response to a driving command of the vehicle control device 3. The sound generator device 105 includes a loudspeaker and the like and is used to output an alarm, voice guidance, or the like for a driver. The display device 106 includes a display of a navigation device or the like, a meter panel, a warning light, and the like. The display device 106 displays an operation screen for the vehicle control device 3, a warning screen for visually notifying a driver of a fact that the host vehicle is in danger of collision with an obstacle, or the like.

The target route generator 31 generates a travel route for moving the host vehicle from the current host vehicle position to a target position. For example, assuming that a vehicle travels on a public road, a destination is set using a navigation device or the like provided with map data, and the route is generated from information such as a positional relationship between the host vehicle and the obstacle or a traffic lane location for traveling to the destination.

The collision predictor 32 determines whether or not the host vehicle and the obstacle will collide when the host vehicle travels along the travel route generated by the target route generator 31. The collision predictor 32 predicts a travel route of the mobile object on the basis of a recognition result of the surrounding environment recognition unit 22. A travel route of the mobile object, in particular, a travel route of the pedestrian is predicted on the basis of a pedestrian's posture and a change of the posture as described below. In addition, it is determined whether or not host vehicle collides with the mobile object at an intersection between the travel route of the host vehicle and the predicted travel route of the mobile object.

The vehicle controller 33 controls a host vehicle along the target route Generated by the target route generator 31. The vehicle controller 33 calculates a target steering angle and a target speed on the basis of the target route. Note that, when the collision predictor 32 predicts a collision between the host vehicle and the obstacle, the vehicle controller 33 calculates the target steering angle and the target speed such that the host vehicle does not collide with the obstacle. In addition, the vehicle controller 33 outputs a target steering torque for implementing the target steering angle to the steering device 102. In addition, the vehicle controller 33 outputs a target engine torque or a target braking pressure for implementing the target speed to the driving device 103 or the braking device 104.

Figure 2:
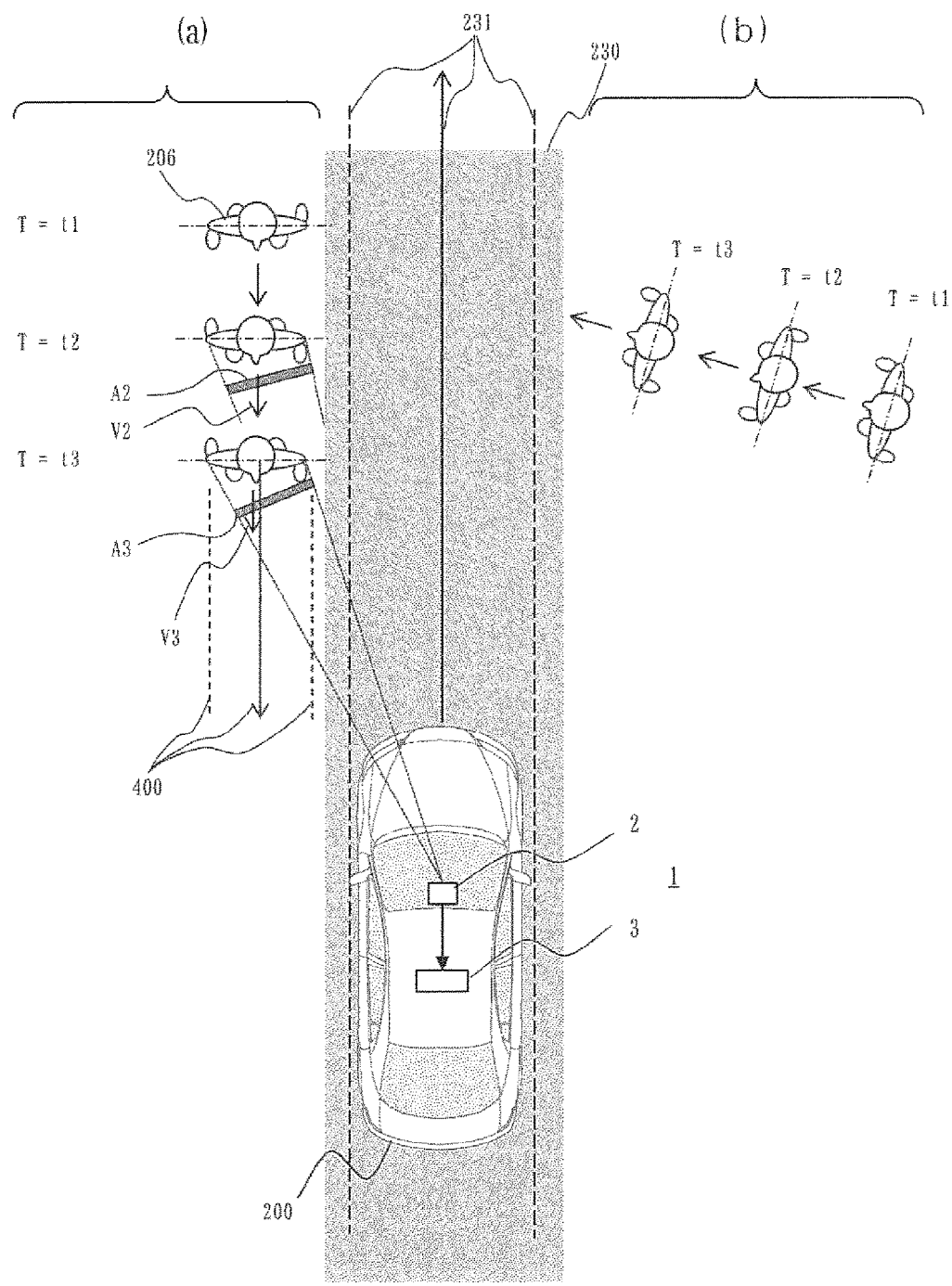
FIGS. 2(a) and 2(b) are diagrams illustrating a control method according to the present invention.
Figure 3:
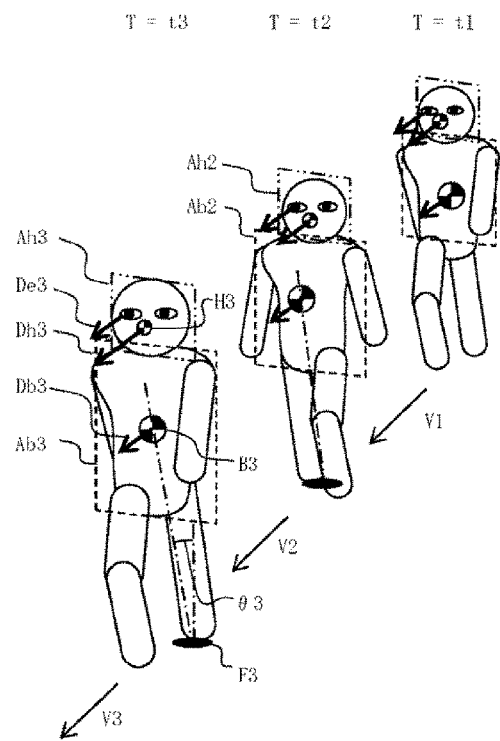
FIGS. 3(a) and 3(b) are diagrams illustrating a pedestrian's posture recognition method according to the present invention.
Figure 3:
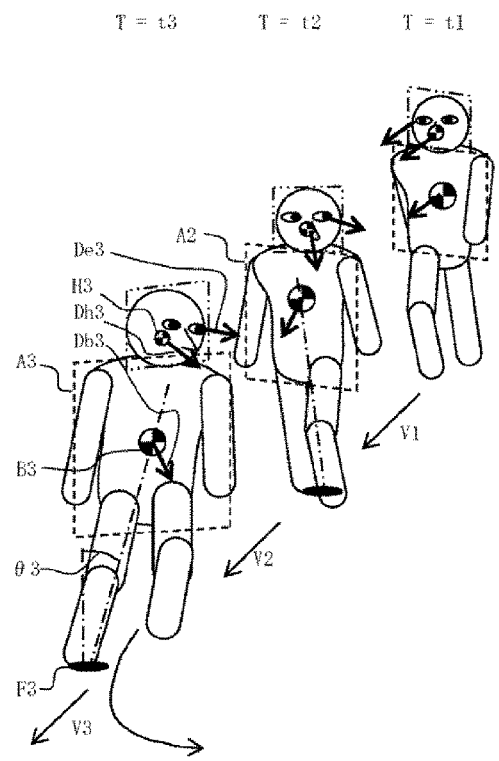
Figure 3:
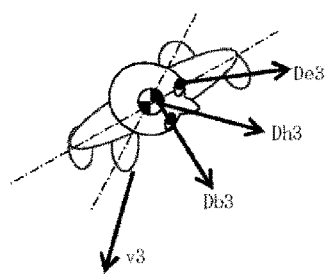

Now, an operation of the travel control device 1 performed, for example, when the host vehicle travels straightly, by assuming that the host vehicle passes by the vicinity of a pedestrian will be described with reference to FIGS. 2 and 3. A driver manipulates an automatic driving button (not shown) in advance to start an automatic driving mode.

The image data obtained by photographing the surroundings of the host vehicle are input from the external environment recognition device 21 to the surrounding environment recognition unit 22 on a frame basis. The surrounding environment recognition unit 22 calculates a travel space 230 using the image data input from the external environment recognition device 21. Here, the external environment recognition device 21 is an on-vehicle camera that photographs the surrounding environment in front of the host vehicle.

FIGS. 3(a) to 3(b) illustrate exemplary images for a forward sight of the host vehicle generated by the surrounding environment detection device 2 at timings T=t1, T=t2, and T=t3 on a constant interval basis. In the following description, it is assumed that "T=t3" is the current timing, and the subscripts 1, 2, and 3 of the reference signs denote information at the timings T=t1, T=t2, and T=t3, respectively. In the forward sight image of FIG. 3(a), a pedestrian 206 walks straight in the forward left side of the host vehicle 200 in the opposite direction in parallel to the host vehicle.

The pedestrian 206 is detected from the forward sight image from the external environment recognition device 21 by applying a pattern matching technique well known in the art to the forward sight image. In addition, information regarding the position thereof or the like is obtained. For example, the surrounding environment recognition unit 22 recognizes a contour of the pedestrian 206 as shape data obtained by straightly linking the contour of the pedestrian 206. In addition, the surrounding environment recognition unit 22 detects a movement direction of the pedestrian 206 from a difference between the images at the timings T (t1, t2, and t3) and obtains speed vectors V1, V2, and V3 representing movement velocities thereof.

In the surrounding environment recognition unit 22, information regarding the shape of the pedestrian is set in advance, so that the pedestrian is recognized distinguishably from other obstacles such as a vehicle. As illustrated in FIGS. 3(a) to 3(c), an approximate bust center position B and an approximate head center position H of a pedestrian are recognized. In addition, as illustrated in FIG. 3(c), a bust direction Db, a head direction Dh, and each line-of-sight direction De of the pedestrian are recognized. Furthermore, a projected area Ah of the head and a projected area Ab of the bust of the pedestrian are recognized for the external environment recognition device 21. Moreover, a grounded point F between the pedestrian's leg and the ground surface is recognized. Furthermore, an inverted angle $\theta$ of the bust (an angle between a line obtained by linking the approximate center position B and the approximate grounded point F and a vertical direction) is also recognized. The head direction Dh and each line-of-sight direction De may be estimated on the basis of the projected area A for the external environment recognition device 21, a direction of the line obtained by linking left and right shoulders, and the like.

Figure 4:
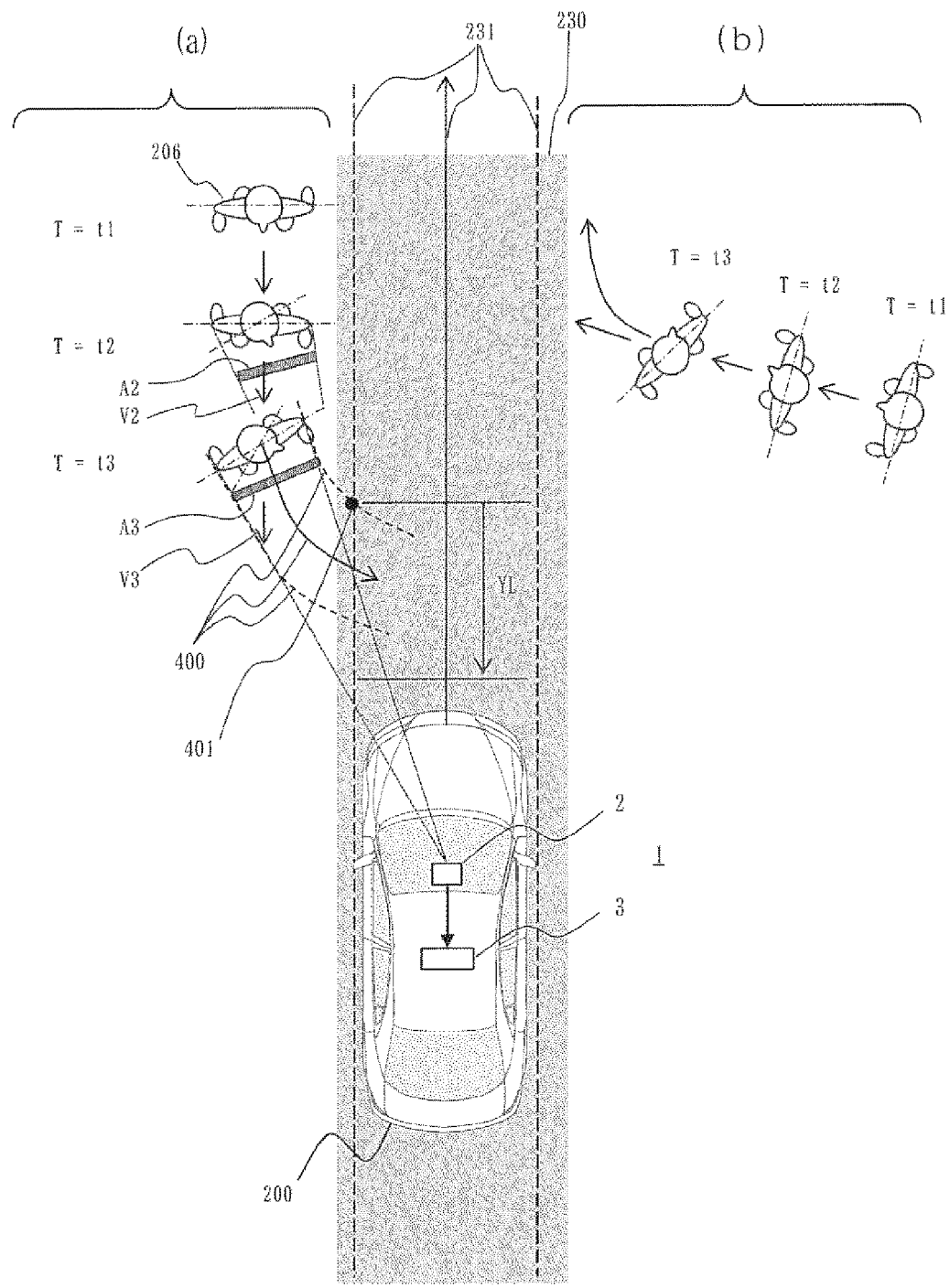
FIGS. 4(a) and 4(b) are diagrams illustrating a control method according to the present invention.

The surrounding environment recognition unit 22 sets an allowable space 230 where no obstacle exists, for example, on the basis of the forward sight image illustrated in FIGS. 4(a) and 4(b). The target route generator 31 starts a process of generating a target route. The target route generator 31 calculates a target route 231 such that the vehicle travels the allowable space 230 detected by the surrounding environment recognition unit 22. Note that, since the mobile object such as a pedestrian has a size, the target route 231 becomes a band-shaped travel route having a width. The target route generator 31 expresses a travel route of a straight interval as a straight line and approximates a turning route by combining a clothoid curve and a circular arc.

The collision predictor 32 determines whether or not the host vehicle 200 collides with the obstacle when it moves along the target route 231. The collision predictor 32 calculates a predicted route 400 predicted as the pedestrian 206 passes on the basis of a movement direction of the mobile object, for example, a movement direction of the pedestrian 206 detected by the surrounding environment recognition unit 22. Note that, since the mobile object such as a pedestrian has a size, the predicted route 400 becomes a band-shaped travel route having a width.

FIG. 2(a) is a diagram illustrating an exemplary predicted route 400 of the pedestrian 206 generated by the collision predictor 32. In the predicted route 400 of this example, it is assumed that the pedestrian 206 walks straightly and directly as indicated by the speed vector V3.

The collision predictor 32 obtains information regarding the bust center position B, the head center position H, the bust direction Db, the head direction Dh, the line-of-sight direction De, the head projected area Ah, the bust projected area Ab, the grounded point F, and the bust inverted angle $\theta$ of a pedestrian from the surrounding environment recognition unit 22 as described above. The vehicle control device 3 stores at least one previous version of this information in the memory unit 34. Specifically, in addition to the current timing T=t3, information at the timing T=t2 is stored. In the case of FIG. 2(a), there is no significant change in the body directions Db, Dh, and De or the inverted angle $\theta$ between the current timing T=t3 and the previous timing T=t2. In this case, the collision predictor 32 predicts that the direction of the speed vector V3 remains as it is.

The collision predictor 32 calculates a predicted collision intersection 401 between the target route 231 and the predicted route 400 as a position where the host vehicle 200 possibly collides with the obstacle. The collision predictor 32 calculates the target route 231 of the host vehicle 200 and the time elapsing until each of the host vehicle and the pedestrian arrives at the predicted collision intersection 401 of the predicted route 400 of the pedestrian 206, and determines whether or not the host vehicle 200 and the pedestrian 206 collide with each other on the basis of a positional relationship when each of the host vehicle and the pedestrian arrives at the predicted collision intersection 401. In the case of FIG. 2(a), since there is no predicted collision intersection 401 between the target route 231 and the predicted route 400, the collision predictor 32 outputs a determination result that the host vehicle 200 does not collide with the pedestrian 206 to the vehicle controller 33. In this case, the vehicle controller 33 guides the host vehicle 200 along the target route 231 generated by the target route generator 31. In this case, the vehicle controller 33 determines the target speed and the target steering angle such that the host vehicle 200 moves along the target route 231. In addition, the vehicle controller 33 outputs the target steering angle to the steering device 102 and outputs the target speed to the driving device 103 and the braking device 104. However, considering a case where the pedestrian abruptly approaches the target route 321, such as a case where the pedestrian turns over, the vehicle controller 33 may decelerate the host vehicle 200. For the similar reason, the vehicle controller 33 may performs the calculation again such that the target route 231 becomes distant from the pedestrian.

Next, a case where it is determined that the host vehicle 200 collides with the pedestrian 206 will be described with reference to FIGS. 3(b) and 4(a). It is assumed that the surrounding environment recognition unit 22 outputs information regarding the image data and the pedestrian as illustrated in FIG. 3(b).

When a pedestrian changes a travel route, a change symptom is exhibited starting from a part having a small physical load. Initially, a direction of the body changes in order of the line-of-sight direction De, the head direction Dh, the bust direction Db, and the entire body direction. In addition, when a pedestrian going straight changes the direction, the inverted angle $\theta$ of the bust also changes before the walking speed changes. Therefore, it is possible to predict a travel route change of the pedestrian more accurately at the earlier timing by obtaining a change of the direction or angle of each part using the surrounding environment detection device 2 in addition to the information on the walking speed or the walking acceleration.

In the example of FIG. 3(b), at the timing t2, the light-of-sight direction De2 and the head direction Dh2 are directed to the left more than the bust direction Db2 or the speed vector V2. Similarly, at this timing, it is possible to predict a possibility that the pedestrian 206 turns to the left. At the timing t3, the bust direction is also directed to the left more than the speed vector V2. In addition, the inverted angle $\theta 3$ also changes to the left falling direction. It may be determined that the pedestrian 206 turns to the left on the basis of such a change of the direction or the angle.

In this case, the collision predictor 32 determines that the host vehicle 200 may collide with the obstacle on the target route 321, and the vehicle controller 33 performs control such that the host vehicle 200 is decelerated or stops in some cases before a marginal distance YL from the intersection 401 on the forward travel route 300 to avoid collision with the pedestrian 206. In this case, the target speed is set lower, compared to a case where a determination result that the host vehicle 200 does not collide with the pedestrian 206 is obtained.

Here, it is desirable to change the marginal distance YL on the basis of the travel direction of the pedestrian 206 at the predicted collision intersection 401. For example, if a case where the speed vector of host vehicle 200 is perpendicular to the speed vector of the pedestrian 206 is compared with a case where they are in parallel to each other, it can be said that the collision risk is higher when they are perpendicular. For this reason, if the speed vector of the host vehicle 200 and the speed vector of the pedestrian 206 are perpendicular to each other, it is possible to avoid collision with the pedestrian 206 with a more sufficient margin by securing a longer marginal distance YL and reducing the target speed of the host vehicle 200, compared to a case where the speed vector of the host vehicle 200 and the speed vector of the pedestrian 206 are not perpendicular to each other.

In the aforementioned example, in order to avoid the collision, the host vehicle 200 is decelerated depending on the predicted travel route of the pedestrian 206. Alternatively, the target route of the host vehicle 200 may be changed instead of the deceleration or in combination with the deceleration. Specifically, the vehicle controller 33 may perform the calculation again such that the target route 231 becomes distant from the pedestrian. However, in this case, the target route 231 is set such that the host vehicle 200 becomes distant from the pedestrian 206, compared to a case where a determination result that the host vehicle 200 does not collide with the pedestrian 206 is obtained.

Note that the determination result of the collision predictor 32 may be notified to a driver using a sound generator device 105 or the display device 106 without controlling the vehicle 200. In this case, control is performed such that the sound generating timing of the sound generator device 105 is expedited, and the volume increases as the direction or angle of the pedestrian 206 changes to increase the collision risk. Alternatively, control is performed such that the timing of displaying on the display device 106 is expedited, the display luminance increases, and the display area increases as the direction or angle of the pedestrian 206 changes to increase the collision risk.

FIGS. 2(b) and 4(b) illustrates an exemplary case where the pedestrian 206 walks to approach the host vehicle 200. In the case of FIG. 2(b), a change is insignificant in each of the body directions Db, Dh, and De or the inverted angle θ between the current timing T=t3 and the previous timing T=t2. In this case, the collision predictor 32 predicts that the direction of the speed vector V3 remains as it is. It is predicted that the pedestrian 206 enters the travel space 230 of the host vehicle. Meanwhile, in the case of FIG. 4(b), it is predicted that the head direction Dh or the bust direction Db changes in parallel to the target route 231 of the host vehicle 200. Therefore, the vehicle controller 33 reduces the target speed in the case of FIG. 2(b), compared to the case of FIG. 4(b). Alternatively, the target route generator 31 changes the target route to the left.

As described above, the travel control device 1 obtains a change of the travel route of the pedestrian with high accuracy using a change of the posture or a change of the line of sight of the pedestrian, in particular, using a change of the body direction or a change of the inverted angle to appropriately control the vehicle travel. As a result, even when a pedestrian makes a change of the travel route more complicatedly than a constant movement or a constant speed movement, it is possible to predict a motion of the pedestrian at an earlier timing with high accuracy. In addition, as it is predicted that the travel direction of the pedestrian and the travel direction of the host vehicle 200 approach each other perpendicularly on the basis of a change of the posture or the line of sight of the pedestrian, the speed of the host vehicle 200 is controlled to be lower. As a result, it possible to provide a travel control device capable of implementing a safer travel control.

REFERENCE SIGNS LIST 1 travel control device
2 surrounding environment detection device
3 vehicle control device
21 external environment recognition device
22 surrounding environment recognition unit
31 target route generator
32 collision predictor
33 vehicle controller
34 memory unit
102 steering device
103 driving device
104 braking device
105 sound generator device
106 display device
200 host vehicle
206 pedestrian
230 allowable space
231 target route
400 predicted route
401 predicted collision intersection
A projected area for sensor
B bust position
De line-of-sight direction
Db bust direction
Dh head direction
F grounded point
H head position
V speed vector
θ inverted angle

The invention claimed is:
1. A travel control device that enables safer travel control of a vehicle comprising:
a memory that stores a previous body angle of pedestrians; and
a processor that is; communicatively coupled with the memory and the camera, wherein the processor is configured to:
obtain, using the camera, a first image of a pedestrian in a first time period,
determine, using the memory, a first center of the pedestrian based on the first image,
determine, using the memory, a first grounded point between legs of the pedestrian based on the first image,
calculate a first inverted angle between a line obtained by linking the first center and the first grounded point in a vertical direction,
receive, using the camera, a second image of the pedestrian in a second time period,
determine, using the memory, a second center of the pedestrian based on the second image,
determine, using the memory, a second grounded point between the legs of the pedestrian based on the second image, calculate a second inverted angle between a second line obtained by linking the second center and the second grounded point in the vertical direction, predict a travel route of the pedestrian based on a change between the first inverted angle and the second inverted angle, control motion of the vehicle based on the travel route of the pedestrian predicted.

2. The travel control device according to claim 1, wherein the processor is further configured to:

predicts a change of a travel direction of the pedestrian from a change of the body angle of the pedestrian, and control the vehicle such that a speed of the vehicle is decreased when the change of the travel direction results in a path of the vehicle and the travel direction of the pedestrian are perpendicular to each other.

3. The travel control device according to claim 2, wherein a bust direction of the pedestrian defines the body angle.

4. The travel control device according to claim 3, wherein the processor is further configured to:

obtains a head position of the pedestrian from a projected area of the head of the pedestrian with respect to a detection direction of the camera, and obtains the bust direction of the pedestrian using a projected area of the bust of the pedestrian with respect to the detection direction of the camera.

5. The travel control device according to claim 1, wherein the processor is further configured to:

detects a line of sight direction of the pedestrian and a head position of the pedestrian based on the first image, the memory stores the line of sight of the pedestrian and the head position of the pedestrian, and predicts the travel route of the pedestrian using a change of the line of sight direction of the pedestrian and a change of the head position of the pedestrian.

6. The travel control device according to claim 1, wherein the processor is further configured to:

control the vehicle such that a speed of the vehicle is decreased when the second inverted angle of the pedestrian is changed to a pedestrian falling direction.

* * * * *